United States Patent [19]

Marshall et al.

[11] Patent Number: 5,502,459
[45] Date of Patent: Mar. 26, 1996

[54] OPTICAL AUXILIARY INPUT ARRANGEMENT AND METHOD OF USING SAME

[75] Inventors: Roger N. Marshall, Solana Beach; Richard M. Lizon, Escondido; Lane T. Hauck, San Diego, all of Calif.

[73] Assignee: Proxima Corporation, San Diego, Calif.

[21] Appl. No.: 233,741

[22] Filed: Apr. 19, 1994

Related U.S. Application Data

[63] Continuation of Ser. No. 829,916, Feb. 3, 1992, abandoned, which is a continuation-in-part of Ser. No. 829,880, Feb. 3, 1992, abandoned, and a continuation-in-part of Ser. No. 656,803, Feb. 14, 1991, abandoned, which is a continuation-in-part of Ser. No. 611,416, Nov. 9, 1999, Pat. No. 5,181,015, which is a continuation-in-part of Ser. No. 433,029, Nov. 7, 1989, abandoned.

[51] Int. Cl.$^6$ ..................................................... G09G 5/08
[52] U.S. Cl. ........................... 345/158; 345/157; 345/163
[58] Field of Search ...................... 345/163, 158, 345/157, 156, 164, 165, 167, 169, 180, 181; 353/42, 122, 30, 28; 348/734, 744; 356/375

[56] References Cited

U.S. PATENT DOCUMENTS 3,885,096  5/1975  Inuiya ...................................... 345/180
4,280,135  7/1981  Schlossberg ............................... 348/61
4,565,999  1/1986  King et al. ............................... 345/158
4,745,402  5/1988  Auerbach ................................. 345/158
4,808,980  2/1989  Drumm .................................... 345/162
5,115,230  5/1992  Smoot ..................................... 345/157
5,138,304  8/1992  Bronson .................................. 345/180

*Primary Examiner*—Richard Hjerpe
*Assistant Examiner*—Xiao M. Wu
*Attorney, Agent, or Firm*—Bernard L. Kleinke; Jerry R. Potts

[57] ABSTRACT

The optical auxiliary input arrangement for an optical system projecting computer generated images includes an image processing unit and communication interface for detecting the speed at which two high intensity auxiliary light images flash onto the projected computer image, to interpret the images as a mouse double click feature. The optical auxiliary input arrangement accurately and reliably discriminates between user generated double click information without the need of the user being so steady of hand as to cause the auxiliary light information beam to illuminate the same precise location on the viewing surface during the double click operation. The image processing unit and communication interface cooperate together to permit both a low speed mouse and the high speed light generating device to communicate with the system.

21 Claims, 9 Drawing Sheets

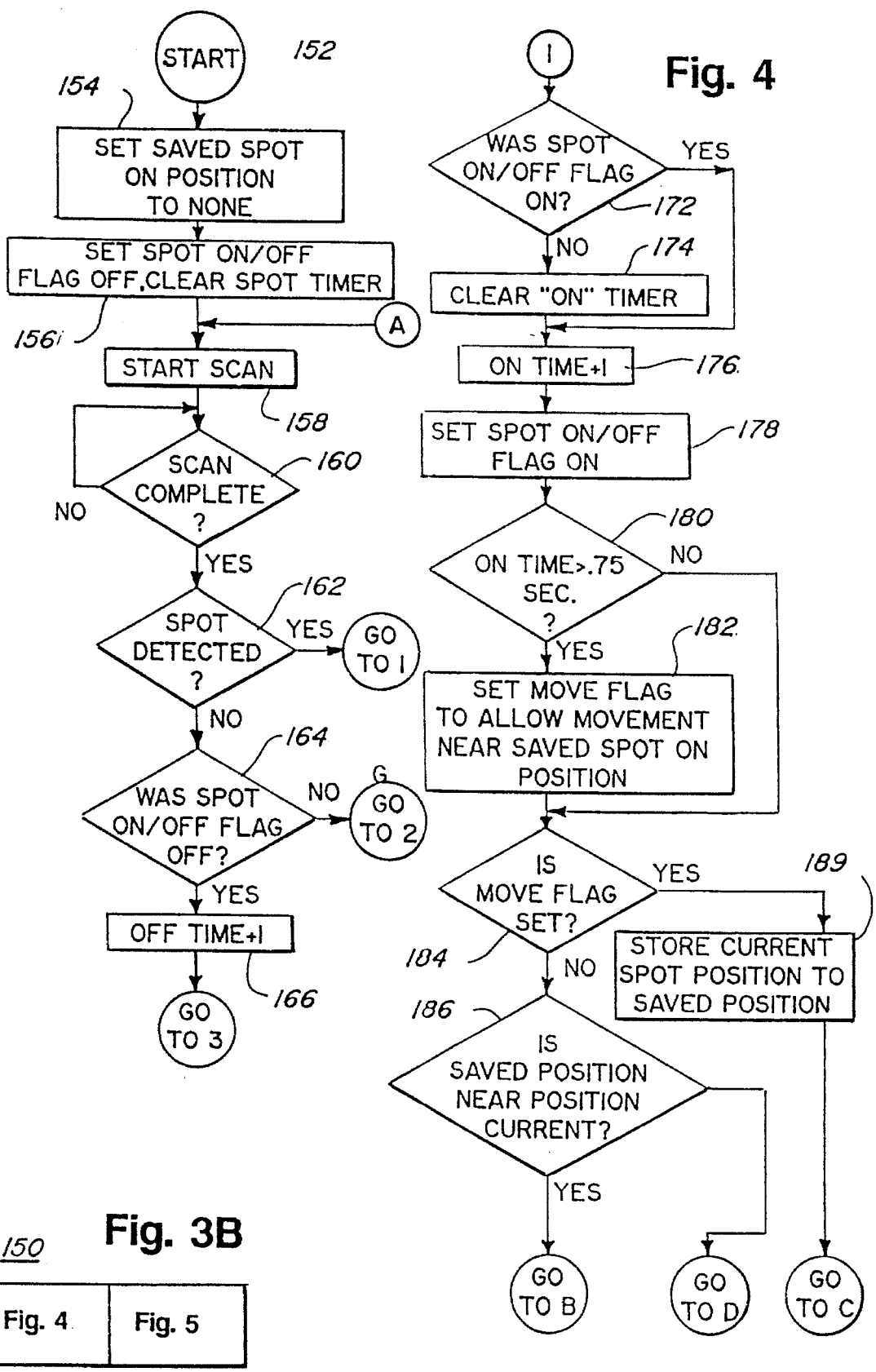

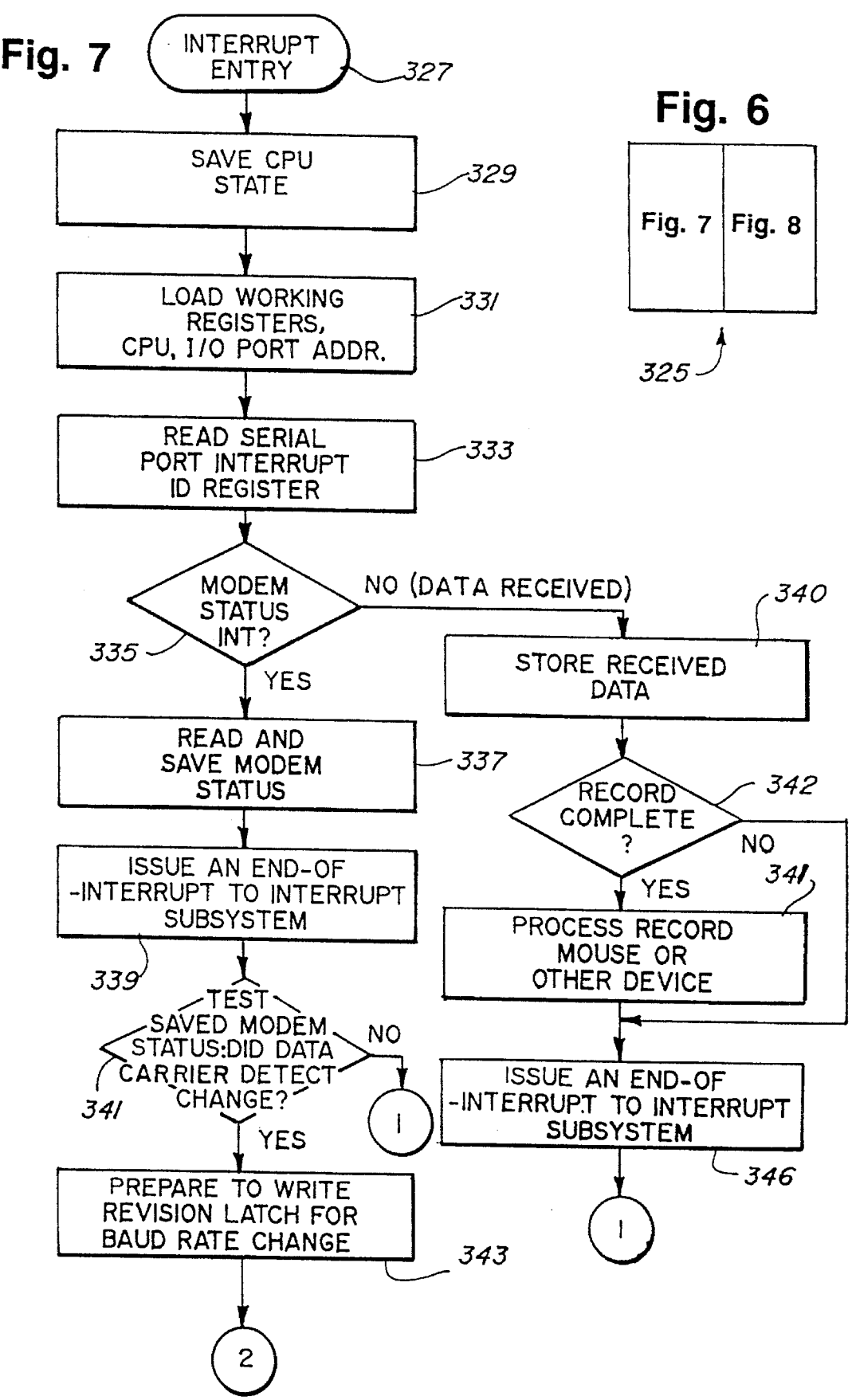

OPTICAL AUXILIARY INPUT ARRANGEMENT AND METHOD OF USING SAME

CROSS-REFERENCE TO RELATED APPLICATIONS

This is a continuation of application Ser. No. 07/829,916, filed on Feb. 3, 1992, now abandoned, which is a continuation-in-part patent application of U.S. patent application Ser. No. 07/829,880, filed Feb. 3, 1992, entitled "OPTICAL SYSTEM AUXILIARY INPUT CALIBRATION ARRANGEMENT AND METHOD OF USING SAME," now abandoned, and a continuation-in-part application of U.S. patent application Ser. No. 07/656,803 filed Feb. 14, 1991 entitled "METHOD AND APPARATUS FOR CALIBRATING GEOMETRICALLY AN OPTICAL COMPUTER INPUT SYSTEM," now abandoned, which is a continuation-in-part application of U.S. patent application Ser. No. 07/611,416, filed Nov. 9, 1990 entitled "METHOD AND APPARATUS FOR CALIBRATING AN OPTICAL COMPUTER INPUT SYSTEM," which is now a U.S. Pat. No. 5,181,015 which is a continuation-in-part of U.S. patent application Ser. No. 07/433,029 filed Nov. 7, 1989, entitled "COMPUTER INPUT SYSTEM AND METHOD OF USING SAME," now abandoned, each of the above mentioned patent applications being incorporated herein by reference.

TECHNICAL FIELD

This invention relates to the general field of a computer input arrangement and the method of using such an arrangement. More particularly, the present invention relates to an optical auxiliary input technique for a system, which projects a computer generated image onto a viewing surface.

BACKGROUND ART

In one type of optical system, computer generated images are projected onto a screen or other suitable surface for viewing by a large number of people simultaneously. An important aspect of such a system is to enable a user to enter information interactively into the system to modify images, or generate additional images during presentations. In one successful arrangement, a user directs a high intensity light from a device, such as a laser pointer, onto a projected image to provide auxiliary control information for the system.

Such a system generally includes a video information source, such as a computer, and a display projection arrangement, such as an overhead projector for projecting video information onto a viewing surface. An image processing arrangement detects and processes the displayed image reflecting from the viewing surface. Such a system detects the high intensity light images produced by the hand held light generating device, and discriminates them from background ambient light as well as the light produced by the video information sources. In this manner, light signals from the hand held light generating device can be detected on the viewing surface and then used by the system for modifying subsequently the projected video information. Such an optical input system is described in greater detail in the above-mentioned U.S. patent application Ser. No. 07/433,029.

While such an optical system and method of using it has proven highly satisfactory, the light generating device of such a system must be held in a very steady manner to assure the accurate communication of the user generated optical information. To help facilitate the accurate communication of such information, the light generating device generally includes a dual beam mode of operation. In this regard, the light generating device is activated by the user manually to generate a low intensity light beam to help the user position the auxiliary light beam on a desired location on the viewing screen without being sensed by the auxiliary input system. Once the low intensity beam is properly positioned in response to the actuation of a switch, the light generating device is then activated manually by the user to produce a high intensity light beam indicative of the auxiliary light information to interact with the computer. In this manner, the high intensity light signal from the hand held light generating device can generate auxiliary information for emulating a mouse. Such a dual beam light generating device and method of using it is described in greater detail in the above-mentioned copending U.S. patent application Ser. No. 07/901,253.

While such a light generating input device and input method has proven highly satisfactory for many applications, it would be desirable to provide a new and improved optical input arrangement and method that would more closely emulate both the single click and double click mouse features of a mouse device in a more convenient manner. More particularly, while the dual beam feature greatly facilitates the single click feature, it has been difficult for a user to use such a device for the double click feature.

The optical auxiliary input system can perform various different control functions, including those performed by conventional computer mouse input device. In this regard, the optical input system can perform such operations as a "single click" a "double click" and a tracking operation as is well known in the art. It is very important that the optical input device be able to function in a similar manner as a conventional computer mouse, since many application computer programs used today, are able to interface with a conventional mouse device for control purposes. In this manner, the optical input system should be compatible, more completely, with conventional application computer programs.

In this regard, the user must hold the light generating input device in such a steady manner, that the same location on the viewing screen is illuminated while the user turns the auxiliary light beam on and off in a repeated sequence. Thus, if the beam is not held at the same location on the viewing surface during the double click operation, the signal processing unit of the optical system can under certain circumstances misinterpret the auxiliary light information. For example, such a double actuation of the light could be interpreted as two, separate single click operations at two different locations on the screen.

One manner of overcoming this problem is to have a much larger area on the screen to be hit by the high intensity light beam so that if the hand of the user should move inadvertently, the double click would still be interpreted correctly. However, this would require undue and unwanted restrictions on application computer programs. It would be far more desirable to have the optical auxiliary input device be more fully compatible with the existing computer program formats.

Therefore, it would be highly desirable to have a new and improved optical auxiliary input arrangement and input method to more closely emulate a computer mouse type input device for use with an optical system. Such an arrangement and method should enable a user to emulate the mouse without the need of holding the auxiliary light image so steady that the auxiliary light information is projected precisely on the same location on the viewing screen during a double click operation.

The arrangement and method should also respond to the user in a fast and reliable manner to more completely emulate the functional features of a mouse input device. In this regard, such an arrangement should enable either a conventional computer mouse or the optical auxiliary input device, a light generating device, to communicate with the same video information source, whenever desired by the user, for modifying or changing displayed images in a simple and reliable manner.

DISCLOSURE OF INVENTION

Therefore, it is the principal object of the present invention to provide a new and improved optical auxiliary input arrangement and method for more closely emulating a mouse input device.

Another object of the present invention is to provide such a new and improved optical auxiliary input arrangement for emulating more closely a mouse double click feature, without requiring the user to hold the auxiliary light beam so steady that it must be projected precisely on the same position of a viewing screen during the double click operation.

A further object of the present invention is to provide such a new and improved optical auxiliary input arrangement and method, which enables either a conventional mouse or the inventive light generating device to communicate with the video information source for modifying or changing displayed images, whenever desired by the user, in a simple and reliable manner.

Briefly, the above and further objects of the present invention are realized by providing a new and improved optical input arrangement and input method for emulating the functional features of a mouse input device in a more accurate and facile manner.

The optical auxiliary input arrangement for an optical system projecting computer generated images includes an image processing unit and communication interface for detecting the speed at which two high intensity auxiliary light images flash onto the projected computer image, to interpret the images as a mouse double click feature.

The optical auxiliary input arrangement accurately and reliably discriminates between user generated double click information without the need of the user being so steady of hand as to cause the auxiliary light information beam to illuminate the same precise location on the viewing surface during the double click operation. The image processing unit and communication interface cooperate together to permit both a low speed mouse and the high speed light generating device to communicate with the system.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 3 to 10 are flow diagrams of the program of a microprocessor forming part of the image processing arrangement of FIG. 2.

BEST MODE FOR CARRYING OUT THE INVENTION

Figure 1:
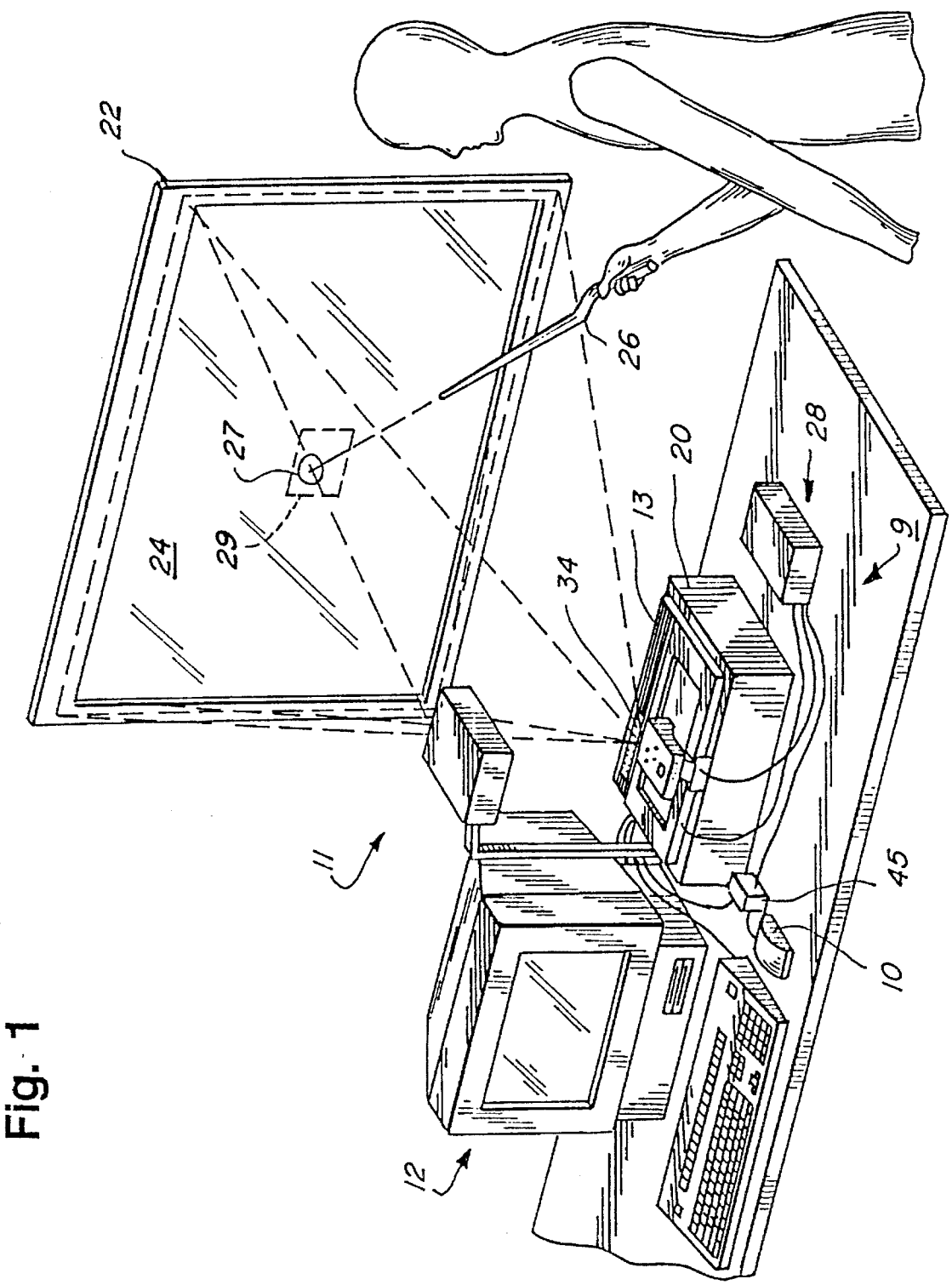
FIG. 1 is a pictorial view of an optical input arrangement which is constructed according to the present invention, illustrating its use with an optical system.
Figure 2:
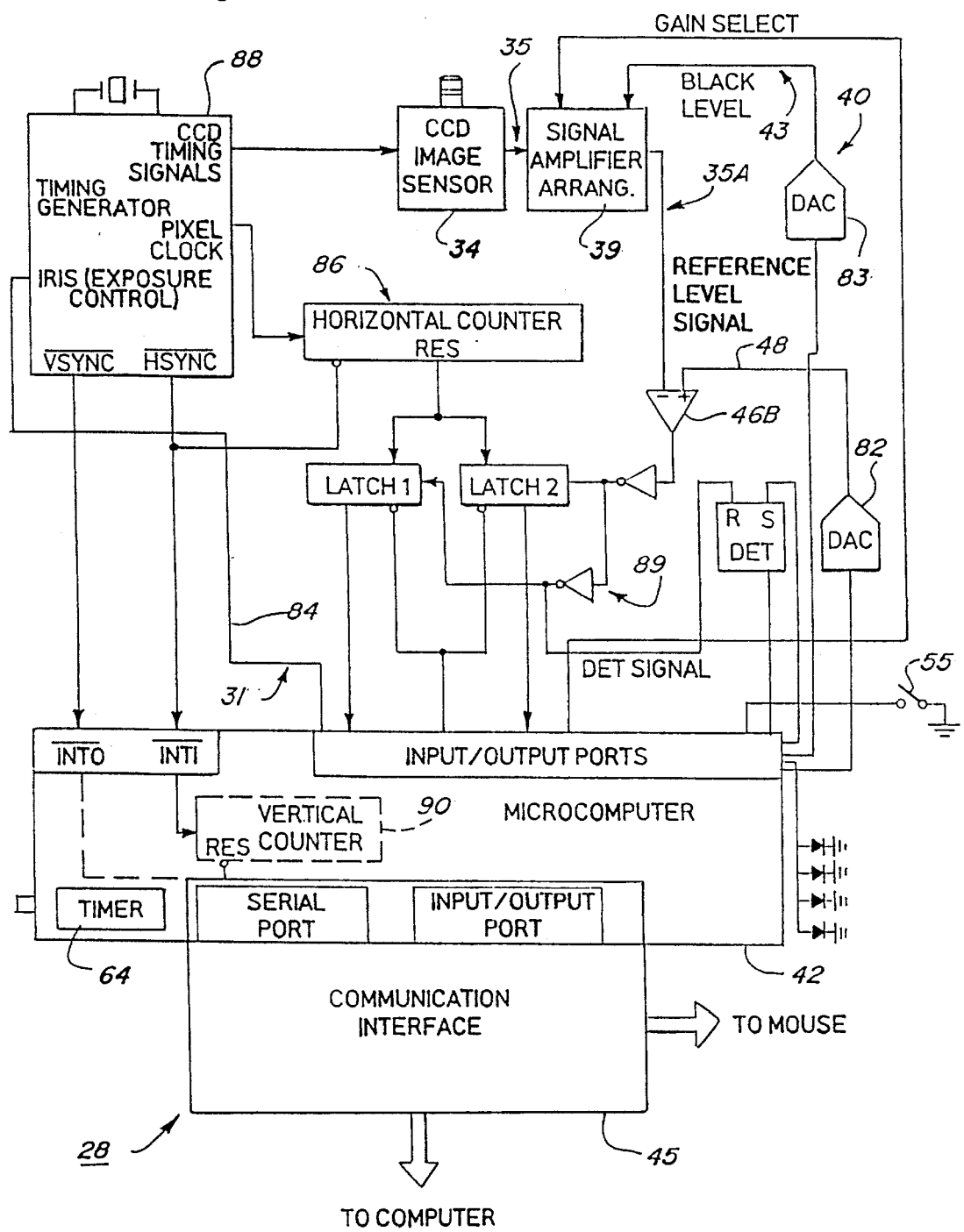
FIG. 2 is a symbolic block diagram of an image processing arrangement forming part of the optical input arrangement of FIG. 1.

Referring now to the drawings, and more particularly to FIGS. 1 and 2, there is illustrated an optical auxiliary input arrangement generally indicated at 9, for emulating a mouse 10 employed in an optical system generally indicated at 11, and which is constructed in accordance to the present invention.

The optical system 11, is more fully described in the above mentioned U.S. patent application Ser. No. 07/433,029 and includes a video information source, such as a personal computer 12, and a liquid crystal display unit 13 for displaying a primary image 24 indicative of the primary image information generated by the computer 12. The liquid crystal display unit 13 is positioned on the stage of an overhead projector 20 for enabling the displayed primary image information to be projected onto a viewing surface, such as a screen 22.

The optical system 11 also includes a light sensing device, such as a raster scan charge coupled device or camera 34 for generating a reflected light information signal 35 indicative of the luminance levels of the video images and other light reflecting from the surface of the screen 22.

As best seen in FIGS. 1 and 2, the optical auxiliary input arrangement 9 generally includes a user actuated dual intensity laser beam light generating device 26 for generating auxiliary light information, such as a spot of reflected light 27 for emulating the mouse 10 and for facilitating the modifying or changing of the primary image information displayed by the liquid crystal display unit 13.

The optical auxiliary input arrangement 9 also includes a signal processing unit 28 coupled between the light sensing device 34 and the computer 12 for converting the auxiliary light information generated by the device 34 into coordinate information for emulating the mouse 10. The signal processing unit 28 is more fully described in copending U.S. patent application Ser. No. 07/,901,253.

The optical auxiliary input arrangement 9 further includes a communication interface generally indicated at 45 that enables both the low speed mouse 10 and the high speed light generating device 26 via the signal processing unit 28, communicate with the computer 12 at substantially different baud rates and data formats. In this regard, while the mouse 10 normally communicates with the computer 12 at a baud rate of about 1200 characters per second, the light generating device 26, via the communication interface 45, communicates with the computer 12 at a baud rate of about 9600 characters per second. This accelerated baud rate facilitates the tracking of the auxiliary light information entered by a user via the light generating device 26.

For the purpose of enabling the light generating device 26 to emulate the mouse 10, the optical auxiliary input arrangement 9 also includes a direct image double click algorithm 150 and a below screen double click algorithm 500 for enabling the light generating device 26 to simulate double click mouse operations and a baud rate algorithm 300 for controlling the baud rate of the communication interface 45. The firmware for baud rate and data format algorithm 300 is located partially within the optical auxiliary input arrangement 9 and partially within the computer 12.

Considering now the operation of the optical input arrangement 9, when the computer 12 commences generating video information, the liquid crystal display unit 13 generates an initiation signal that is coupled to the signal processing unit 28 which beeps to notify the user that he or she may initiate an alignment procedure which is more fully described in copending U.S. patent application Ser. No. 07/829,880.

In this regard, the user depresses an alignment button 55 that causes a series of visual prompts to be generated for informing the user how to adjust the position of the light sensing device 34 to capture the entire projected image 24. Once the user has adjusted the position of the device 34, the user calibrates the signal processing unit 28 by identifying the corner locations of the image 24 with the light generating device 26. In this regard, the user causes a spot of light to be reflected on and off at each respective corner of the image 24 so the signal processing unit 28 will be able to generate accurate and reliable coordinate information in response to the detection of a spot of light produced by the device 26. This calibration process is more fully described in copending U.S. patent application Ser. No. 07/611,416 and will not be described in further detail.

It should be understood by those skilled in the art, that since the field of view 25 of the device 34 is substantially larger than the image 24, certain ones of the raster scan coordinates of the field of view of the device 34 are outside of the image 24. These extraneous raster scan coordinates are utilized to facilitate double click mouse features via the below screen double click algorithm 500 as will be explained hereinafter.

At the end of the calibration process, the signal processing unit 28 generates an initialization signal that enables the light generating device 26 to emulate a mouse.

Considering now the signal processing unit 28 in greater detail with reference to FIGS. 1 and 2, the signal processing unit 28 generally include a signal amplifier circuit 39 for increasing the strength of the reflected light information signal 35 generated by the light sensing device 34 and a signal discrimination apparatus generally indicated at 40, for discriminating auxiliary light information from the other information components in the reflected light information signal 35.

The signal discrimination apparatus 40 includes a comparator 46, for facilitating discriminating between signals indicative of the various sources of light reflecting from the viewing surface 22 and a microprocessor 42 (FIG. 2) for controlling a reference level signal 48 utilized by the comparator 46 for discrimination purposes. In this regard, for discrimination purposes, it should be understood that the light reflecting from the viewing surface 22, has a plurality of luminance levels generally including background ambient light, primary image light, such as the image 24, indicative of primary image information, and user 32 generated auxiliary image light, such as the spot of light 27, indicative of auxiliary light information.

The microprocessor 42 also controls the exposure rate of the light sensing device 34, gain selection for the amplifier arrangement 39, and an offset black level signal 43 that is more fully described in copending U.S. patent application Ser. No. 07/829,880.

Considering now the signal discrimination apparatus 40 in greater detail with reference to FIG. 2, the signal discrimination apparatus 40 controls the exposure rate of the charge couple device 34, the reference level signal 48 for the comparator 46, and the black level and gain select for the signal amplifier arrangement 39. In this regard, in order to convert the digital control signals produced by the microprocessor 42 to analog voltages, the signal discrimination apparatus 40 includes a set of digital to analog converters including a reference level signal converter 82 to a positive input terminal of the comparator 46, and a black level signal converter 83 coupled to the input of the amplifier arrangement 39. As best seen in FIG. 2, the signal discrimination apparatus 40 also includes a counter arrangement 86 and a timing generator 88. The microprocessor 42 controls the exposure time via the timing generator 88.

The counter arrangement 86 includes a horizontal counter and latching arrangement 89 and a vertical counter arrangement 90. The counter arrangement 86 is synchronized with a raster scan sequence of the charge coupled device by a pixel clock generated by the timing generator 88. In this regard, the microprocessor 42 and timing generator 88 cooperate together to control the exposure rate and scanning sequence of the charge couple device 34. More particularly, they cooperate together so that the device 34 will produce an output signal of sufficient magnitude in response to the detection of light.

Figure 5:
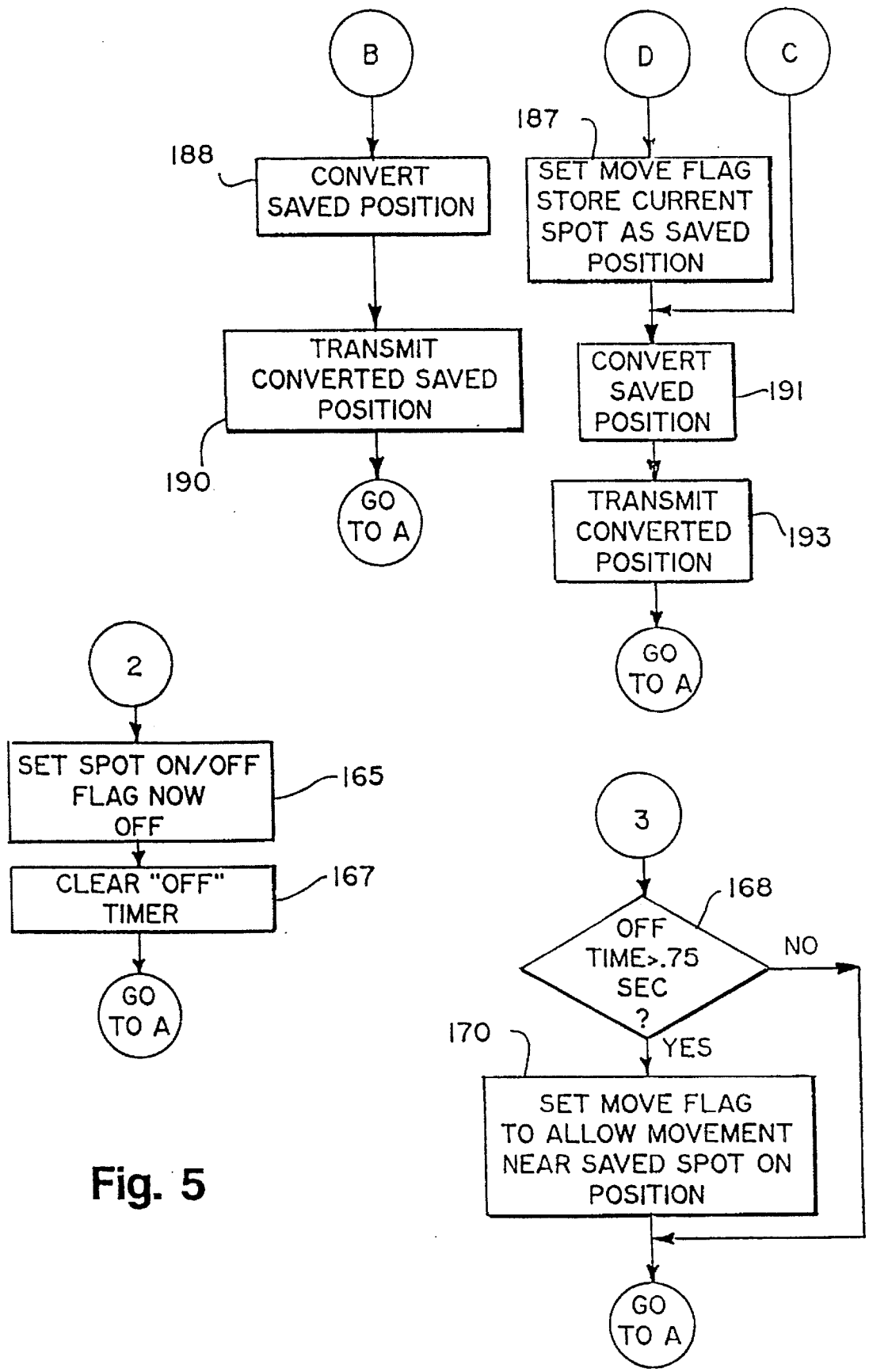

Considering now the double click algorithm 150 in greater detail with reference to FIGS. 3 to 5, the double click algorithm 150 commences at a start instruction 152 (FIG. 4) that is entered when the microprocessor 42 has been calibrated to generate raster scan information corresponding to pixel coordinate information of the image 24.

The program proceeds from instruction 152 to an instruction 154, that causes an internal memory location of the microprocessor 42 designated as "saved spot" to be initialized for the purpose of storing coordinate locations of auxiliary light information. The program next proceeds to an instruction 156, that causes an internal spot timer 64 to be cleared and a spot on/off flag to be reset to off. In this regard, when the spot on/off flag is set to "on" the flag is indicative that a previous spot of auxiliary light, such as the spot 27, was detected by the device 34 and processed by the microprocessor 42. If the spot on/off flag is set to "off," the flag is indicative that a previous spot of auxiliary light was not detected by the light sensing device 34.

After instruction 156 is executed, the program proceeds to an instruction 158 that causes the data from the charge coupled device 34 to be scanned by the microprocessor 42 a scanning sequence. The program then goes to a decision instruction 160, to determine whether the scanning sequence has been completed. If the scanning sequence is not completed, the program waits at instruction 160.

When the scanning sequence is completed, the program advances to a decision instruction 162, to determine whether a spot of auxiliary light was detected. If a spot of auxiliary light was not detected, the program proceeds to a decision instruction 164 to determine whether the spot on/off flag was off. If a spot of auxiliary light was detected, the program proceeds to a decision instruction 172 to determine whether the spot on/off flag was "on."

If the spot on/off flag was "off" at decision instruction 164, the program advances to an instruction 166 that causes the internal spot timer 64 to be advanced by one time increment. The program then goes to a decision instruction 168 (FIG. 5), to determine whether the light generating device 26 has been deactivated for greater than a certain predetermined period of time t, where t is between about 0.5 second and 1.0 seconds. A more preferred time t is between about 0.6 seconds and 0.9 seconds, while the most preferred time t is about 0.75 seconds.

If the light generating device 26 has been deactivated for longer than time t, the program advances to an instruction 170 that causes the microprocessor 42 to set an internal move flag, that permits the user to move the position of the auxiliary spot of light 27 within an imaginary rectangular area of m by n raster scan pixel locations, such as an area 29, for double click simulation purposes.

If the light generating device 26 has not been deactivated for longer than time t, the program returns to the instruction 158 to start another scanning sequence. The program then proceeds from instruction 158 as previously described.

Referring again to the decision instruction 172, if the spot on/off flag was "on," the program goes to an instruction 174 that causes internal spot timer 64 to be cleared. The program then advances to an instruction 176.

If the spot on/off flag was on at decision instruction 172, the program advances to the instruction 176 that cause the timer 64 to be advanced by one time increment. The program then proceeds to an instruction 178, that causes the spot on/off flag to be set to its "on"0 condition.

After instruction 178 is executed the program goes to a decision instruction 180, to determine whether the timer 64 has exceeded a predetermined period of time T, where T is between about 0.5 seconds and 1.0 seconds. A more preferred time T is between about 0.6 seconds and 0.9 seconds, while the most preferred time T is about 0.75 seconds.

If the timer 64 has not exceeded the predetermined period of time T, the program advances to a decision instruction 184. If the timer 64 has exceeded the predetermined period of time T, the program advances to an instruction 182 that causes the move flag to be set to permit the user to move the position of the auxiliary spot of light 27 within an imaginary rectangular area, such as the area 29 for double click simulation purposes. In this regard, as previously noted the imaginary rectangular area is m pixels wide and n pixels tall, where m is about 12 pixels and n is about 6 pixels. A more preferred m is about 8 pixels and a more preferred n is about 4 pixels. The most preferred m pixels and n pixels is about 4 pixels and 2 pixels respectively.

From the foregoing, it will be understood by those skilled in the art, that so long as the user is able to keep the spot of light 27 within the imaginary rectangular area surrounding an initial detection location the microprocessor 42 will seek to determine whether the user is attempting to execute a double click operation.

Referring now to decision instruction 184, if the move flag is not set, the prograin advances to decision instruction 186, to determine whether a previously saved auxiliary spot location is near the current auxiliary spot location; i.e. is the current spot of auxiliary light within the imaginary rectangular area from where the previous spot of auxiliary light was detected. If the current spot of auxiliary light is within the imaginary area, the program advances to an instruction 188 (FIG. 5). If the current spot of auxiliary light is not within the imaginary area, the program advances to an instruction 187 (FIG. 5).

For explanation purposes, it should be understood that the double click feature requires the user to activate, deactivate, activate and deactivate, the light generating device 26, while holding the auxiliary light beam sufficiently steady to cause the spot to remain within an imaginary rectangular area, such as the area 29, while the above mentioned sequence is completed.

Referring again to decision instruction 186, as the saved position was initialized at instruction 154, the program proceeds from the decision instruction 186 to the instruction 187 that causes the move flag to be set. Instruction 187 also causes the microprocessor 42 to store the raster scan location of the current auxiliary spot as a saved spot location. The program then proceeds to an instruction 191 that converts the raster scan location into coordinate information that corresponds to image coordinates.

After the raster scan location has been converted into coordinate information, the program advances to an instruction 193 that causes the communication interface 45 to transmit the coordinate information to the computer 12.

Referring again to decision instruction 184, if the current spot of auxiliary light has not been on for more than T seconds, and the spot on/off flag is on, the program advances to an instruction 189 as the move flag will have been set at instruction 182. Instruction 189 causes the microprocessor 42 to store the current spot location as a saved position and then proceeds to the instruction 191. The program proceeds from instruction 191 as previously described.

Referring again to decision instruction 184, if the current spot of auxiliary light has been on for less than T seconds, and the spot on/off flag is off, the program advances to the decision instruction 186 as the move flag will not have been set at instruction 182. Decision instruction 186, causes the microprocessor 42 to determine whether the location of the saved auxiliary light spot is near the location of the current auxiliary light spot. If the spot is within the area 29 for example, the program advances to the instruction 188 that causes the saved auxiliary light location to be converted into coordinate information. The program then goes to an instruction 190, that causes the coordinate information to be transmitted to the computer 12 via the communication interface 45. After transmitting the coordinate information to the computer 12, the program returns to instruction 158 and proceeds as previously described.

From the foregoing, it should be understood that the same coordinate information will be transmitted to the computer 12 so long as the user executes the double click operation within the predetermined period of time t and T respectively and keeps the auxiliary light spot 27 within the boundaries of an associated imaginary rectangular area, such as the area 29.

Referring again to decision instruction 164 (FIG. 4), if the spot on/off flag is not "off," the program advances to an instruction 165 (FIG. 5) that causes the microprocessor 42 to set the spot on/off flag to "off." The program then proceeds to an instruction 167, that causes the timer 64 to be cleared.

After the timer 64 has been cleared at instruction 167, the program returns to instruction 158 and proceeds as previously described.

Considering now the baud rate algorithm 300 in greater detail with reference to FIGS. 6–8 and 10, the baud rate algorithm 300 begins at a start instruction 302 (FIG. 10) and proceeds to a decision instruction 303 to determine whether the calibration of the charge couple device 34 has been completed. If calibration has not been completed the program waits at instruction 303.

When calibration has been completed, the program goes to a decision instruction 304 to determine whether auxiliary light information has been received by the microprocessor 42. If auxiliary light information has not been received, the program waits at decision instruction 304 until auxiliary light information is received.

When auxiliary light information is received, the program advances to decision instruction 305 to determine whether a dmux signal and a smux signal has been asserted. If the signals have not been asserted, the program goes to an instruction 307 that causes the dmux and smux signals to be asserted. The smux signal informs the computer 12 that the baud rate must be switched to the 9600 baud rate.

If the dmux and smux signals have already been asserted, the program goes to a decision instruction 306 to determine whether the auxiliary light image is new or has moved from its previous position.

Referring again to instruction 307, once the dmux and smux signals have been asserted, the program goes to the decision instruction 306. Also, the program executes a call instruction 309 that call an interrupt subroutine 325 that will be described hereinafter in greater detail.

When the smux signal is received by the computer 12, the computer 12 passes control to the interrupt subroutine 325 implemented in the software of the computer 12.

Referring to decision instruction 306, if the light has moved or is new, the program goes to a decision instruction 370 to determine whether auxiliary information is ready to be sent to the computer 12. If the information is not available, the program waits at instruction 370.

When the auxiliary information is available to be transmitted to the computer 12, the program advances to an instruction 372 that causes the microprocessor 42 to transmit the auxiliary light information to the computer 12. The program then goes to a decision instruction 374 to determine whether the auxiliary light information has been transmitted to the computer 12. If the information has not been transmitted the program waits at decision instruction 374 until the transmission is completed.

Once the transmission of the auxiliary light information has been completed, the program advances to an instruction 376 that causes the dmux signal and smux signals to be negated to inform the computer 12 that the light generating device 26 no longer requires the serial port. The program then changes the state of the dmux and smux signals which causes the interrupt subroutine 325 (FIGS. 6–8) to be executed by the computer 12. The computer 12 then switches the interface parameters. The program also returns to the decision instruction 304 and proceeds as previously described.

Figure 8:
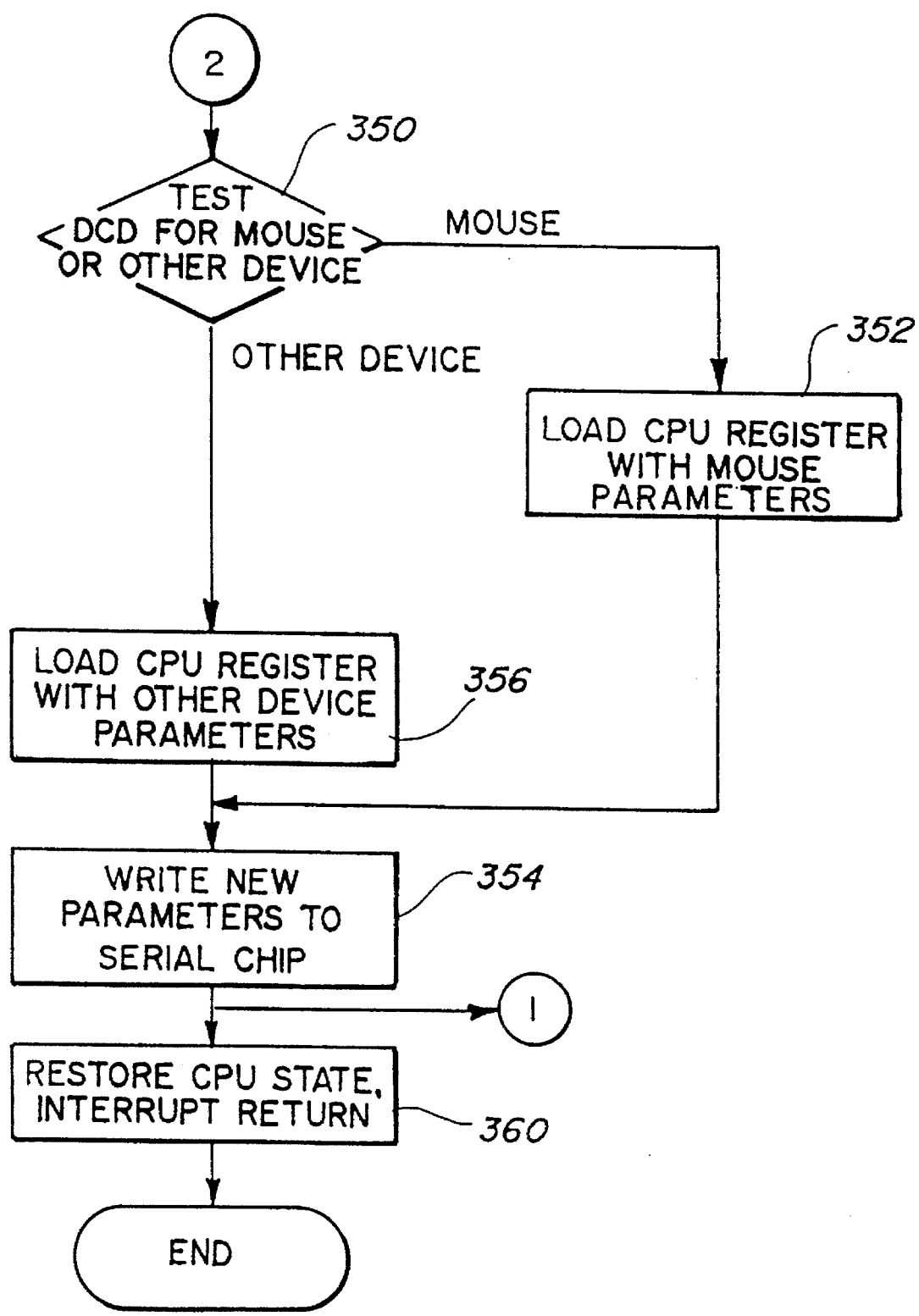

Considering now the interrupt subroutine 325 in greater detail with reference to FIGS. 6–8, the interrupt subroutine 325 which resides in the computer 12 commences at an interrupt entry instruction 327 (FIG. 7) and proceeds to an instruction 329 that causes a set of CPU registers (not shown) in the computer 12 to be saved. The program then proceeds to an instruction 331 that causes a set of working registers to be loaded with information to address the serial port residing in computer 12. The program then goes to an instruction 333 that causes a serial port interrupt identification register (not shown) to be retrieved.

The program then advances from instruction 333 to a decision instruction 335, to determine whether the retrieved information was a modem status interrupt or data available interrupt.

If the retrieved information is indicative of a modem status interrupt, the program advances to an instruction 337 that causes the computer 12 to read and save the modem status from the serial port. If the retrieved information indicates a data available interrupt, the program advances to an instruction 340 that causes the received data to be read and stored.

Referring again to the instruction 337, after the computer 12 reads and saves the modem status, the program proceeds to an instruction 339, that causes the computer 12 to issue an end-of-interrupt operation to an interrupt subsystem (not shown). The program then goes to a decision instruction 341 to determine whether the data carrier detect signal changed causing the modem status interrupt.

If the data carrier detect signal did not change, the program proceeds to an instruction 360 (FIG. 8) that causes the CPU registers to be restored and control returned to computer 12.

If the decision instruction 341 determines the data carrier detect signal changed, the program proceeds to an instruction 343 that prepares the computer 12 to change the serial port parameters. The program then advances to a decision instruction 350 (FIG. 8) that determines whether the state of the data carrier detect signal specifies that the communication interface 45 is set for the mouse 10 or the light generating device 26 via the microprocessor 42.

If the data carrier detect signal specifies the mouse 10, the program goes to an instruction 352 that causes the communication registers to be loaded with a set of mouse parameters that includes a baud rate parameter, a data bit packet parameter, a parity parameter, and a stop bit parameter. After loading the communication register with the mouse parameters, the program goes to an instruction 354 that causes the new baud rate to be loaded into a serial port interface chip (not shown) to enable communication at the new baud rate. After loading the serial chip, the program goes to the instruction 360 and proceeds as previously described.

Referring again the decision instruction 350 (FIG. 8), if the data carrier detect signal specifies the light generating device 34 via the microprocessor 42, the program advances to an instruction 356 that causes the communication registers to be loaded with optical input device parameters that include a baud rate parameter, a data packet parameter, a parity parameter, and a stop bit parameter. After loading the communication registers, the program goes to instruction 354 and proceeds as previously described.

After the data received on the serial port is stored at instruction 340, the program advances to a decision instruction 342 to determine whether a complete packet or record has been received. If the record is not complete, the program goes to an instruction 346 that causes an end-of-interrupt signal to be generated to the interrupt subsystem the end-of-interrupt signal is generated, the program goes to instruction 360 and proceeds as previously described.

If a determination is made at decision instruction 342 that the packet was complete, the program goes to an instruction 341 and processes the coordinate information received from either the mouse 10 or the optical input device 34. After processing the data the program advances to instruction 346 and proceeds as previously described.

Figure 11:
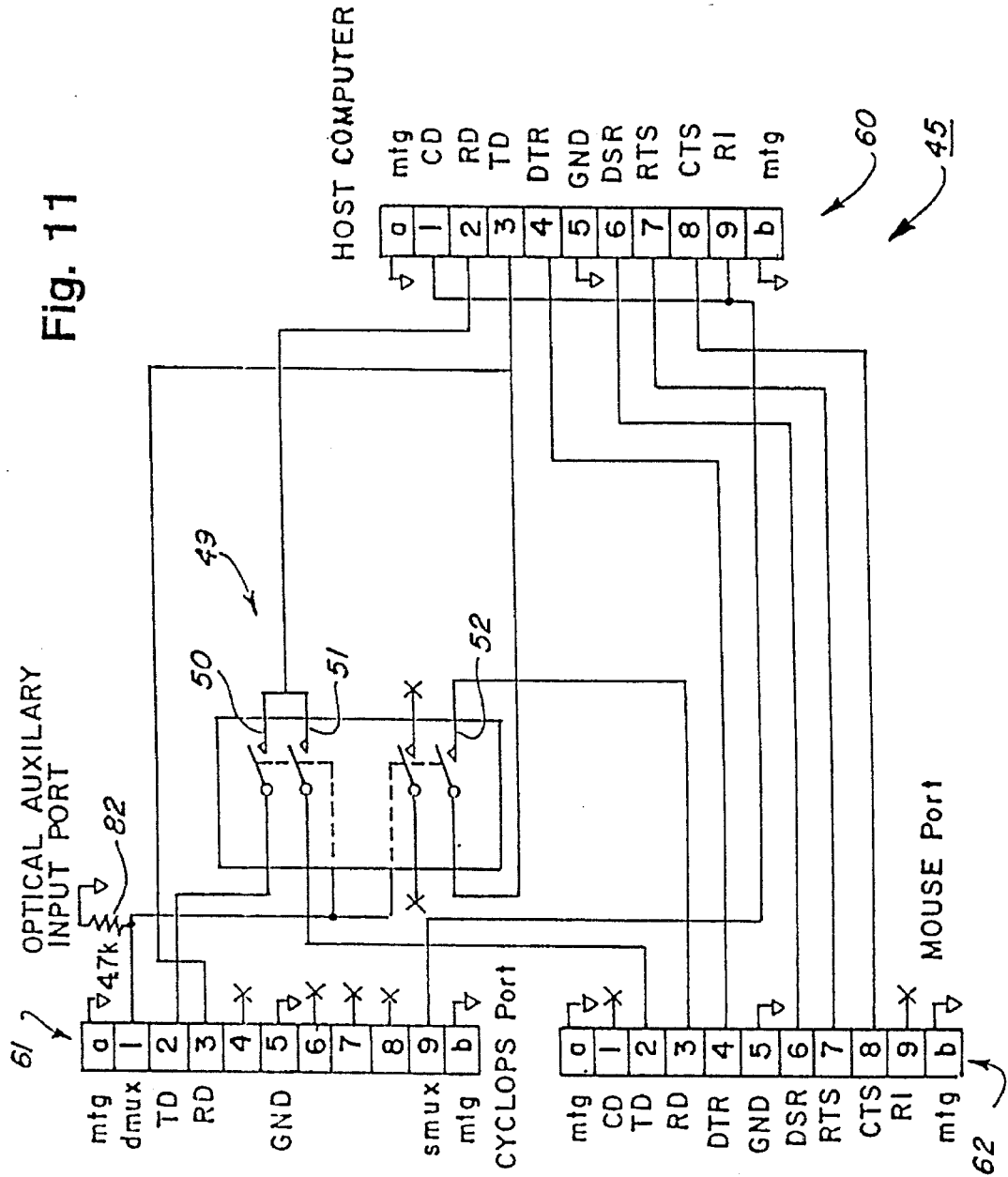
FIG. 11 is a symbolic block diagram of a communication interface of FIG. 1.

Referring now to the communication interface 45 in greater detail with reference to FIG. 11, the communication interface 45 includes a gang switch 49 having three discrete switches 50, 51 and 52 for dynamically switching the data path between a low baud rate device, such as 1200 baud, and a (high) baud rate device, such as 9600 baud. The communication interface also includes a pull up resistor 82 for helping to facilitate the state of the system operation (when the optical auxiliary input device 78 is not plugged into connector 61) and the mouse 10 is used, dmux signal is a logical low.

The communication interface 45 further includes a set of 3 DB9 pin connectors. In this regard, the set of connectors include a host computer connector 60 for the computer 12, an optical input device connector 61 for the microprocessor 42, and a mouse connector 62 for the mouse 10.

The signal names of the connections between the computer 12 and the input devices, such as the optical auxiliary input arrangement 9 and the mouse 10, are defined by an IEEE RS-232C specification serial port to external modem as mapped to a 9-pin connector by IBM corporation.

Considering now the host computer connector 60 in greater detail with reference to FIG. 11, Table I illustrates the connector pin numbers and the signals carried by each respective pin.

TABLE I

| PIN NUMBER | SIGNAL ABBREVIATION | SIGNAL FUNCTION |
|---|---|---|
| 1 | CD | Signal to the host computer that the base sending and receiving tones have been detected by the receiving and transmitting modems. |
| 2 | RD | This line to the host computer receives the data from the external device. |
| 3 | TD | This line from the host computer sends the data to the external device. |
| 4 | DTR | A signal from the host computer telling the external device that it is 'ready', powered on, or operating. |
| 5 | GND | Ground connection. |
| 6 | DSR | A signal from an external device telling the host computer that it is 'ready', powered on, or operating. |
| 7 | RTS | A signal from the host computer asking the external device if it is ok to send data to the external device. |
| 8 | CTS | A signal from the external device to the host computer, in response to the RTS from the host, when transmission is ready to proceed. |
| 9 | RI | A signal from the external device to the host computer that the phone on the remote end of the external device is ringing. |

Considering now the optical input device connector 61 in greater detail with reference to FIG. 11, Table II provides the connector pin numbers and signals caused by each respective pin, as used by the communication interface 45.

TABLE II

| PIN NUMBER | SIGNAL ABBREVIATION | SIGNAL FUNCTION |
|---|---|---|
| 1 | dmux | A digital control signal from CYCLOPS to set the switch to either the CYCLOPS or mouse position. |
| 2 | TD | Data transmitted from CYCLOPS is sent to the host computer over this line. |
| 3 | RD | Data transmitted to CYCLOPS from the host computer is received over this line. Data from the host computer is received both by CYCLOPS and the mouse. |
| 4 | | No connection. |

TABLE II-continued

| PIN NUMBER | SIGNAL ABBREVIATION | SIGNAL FUNCTION |
|---|---|---|
| 5 | GND | Ground connection. |
| 6 | | No connection |
| 7 | | No connection |
| 8 | | No connection |
| 9 | smux | An RS-232 level signal that can be sensed by the host computer software by using a serial port chip. |

Considering now the mouse connector 62 in greater detail with reference to FIG. 11, Table III shows the signals carrier by each respective pin.

TABLE III

| PIN NUMBER | SIGNAL ABBREVIATION | SIGNAL FUNCTION |
|---|---|---|
| 1 | CD | Not connected. |
| 2 | TD | Used to send data to the host computer. |
| 3 | RD | Used by the mouse to receive power. Used to receive data from the host computer. |
| 4 | DTR | Used by the mouse to receive power. |
| 5 | GND | Ground connection. |
| 6 | DSR | Different manufacturers of mice can use CTS and DSR so these are connected to the host computer. |
| 7 | RTS | Used by the mouse to receive power. |
| 8 | CTS | Different manufacturers of mice can use CTS and DSR so these are connected to the host computer. |
| 9 | RI | Not connected. |

Considering now the operation of the communication interface 45 with reference to FIG. 11, when the microprocessor 42 causes the signal dmux to be generated, switch 50 is forced to a closed position establishing a data transmission path between the microprocessor 42 and the computer 12. The dmux signal also causes switch 51 to an opened position to terminate the data communication path between the mouse 10 and the computer 12.

The dmux signal further causes switch 52 to an opened position to inhibit the mouse 10 from receiving data from the computer 12. From the foregoing, it should be understood that the dmux signal causes the communication path from the host computer 12 to be switched either to the optical auxiliary input port for the light generating device 26 or to the mouse port for the mouse 10.

Figure 9:
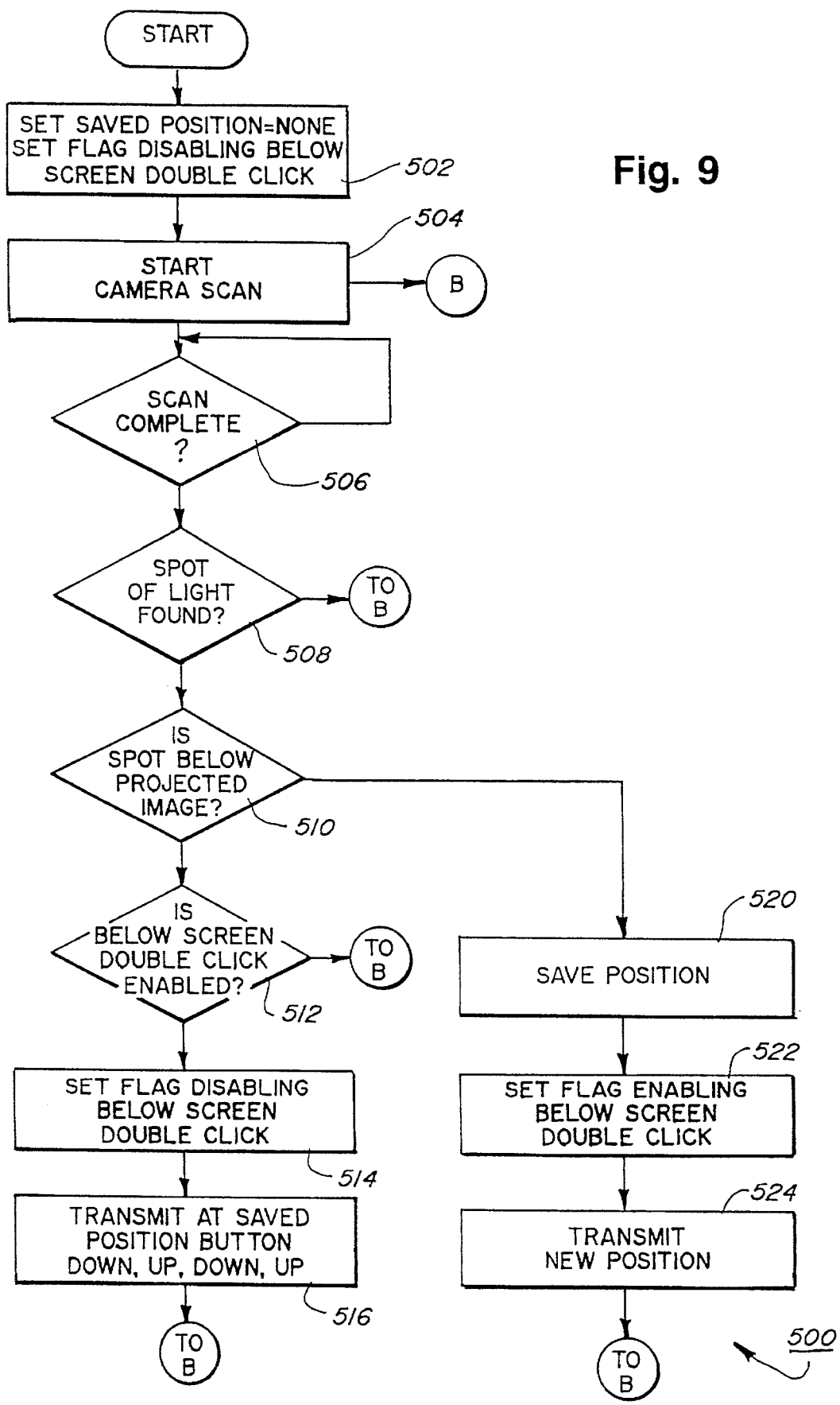
Figure 10:
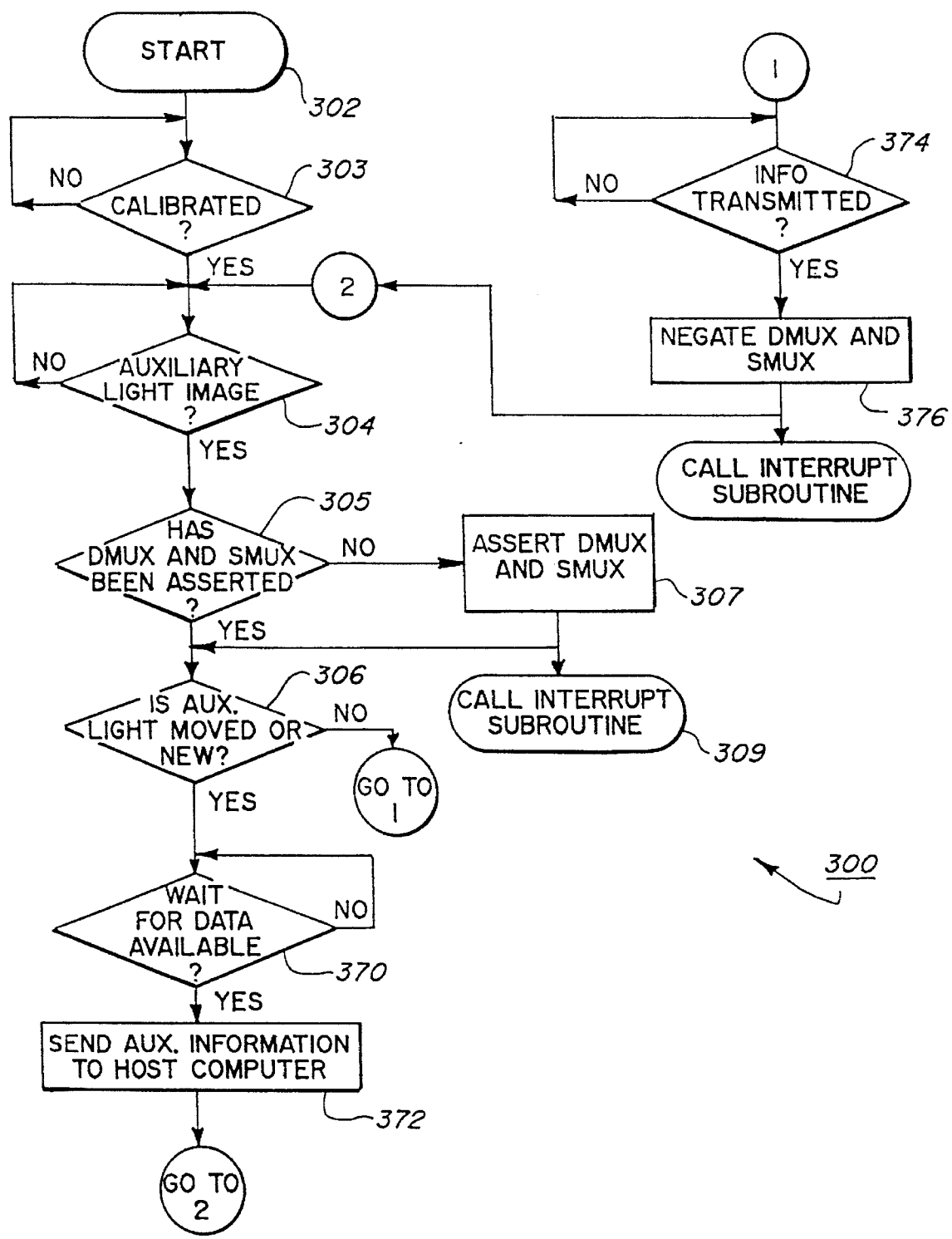

Considering now the below screen click algorithm 500 in greater detail with reference to FIG. 9, the below screen click algorithm 500 commences at a start instruction 501 and proceeds to an instruction 502 that causes the microprocessor 42 to set its saved position register to none and to set a double click flag to disable below screen double click feature.

The program next executes an instruction 504 that causes the charge coupled device 34 to execute another scanning sequence. The program then proceeds to a decision instruction 506 to determine whether the scan has been completed. If the scan has not been completed, the program waits at decision instruction 506.

When the scan is completed, the program goes to a decision instruction 508 to determine whether an auxiliary light image has been detected. If no image was detected the program returns to instruction 504 and proceeds as previously described.

If an auxiliary light image is detected, the program goes to a decision instruction 510 to determine whether the auxiliary light image was detected outside of and below the image 24. If the auxiliary light image was not outside the image 24, the program goes to an instruction 520 that causes the raster scan coordinates of the auxiliary light image to be saved.

Next the program executes an instruction 522 that causes the below screen disable flag to be set on. The program then goes to an instruction 524 that converts the raster scan coordinates into image coordinate information and then transmits the coordinate information to the computer 12. The program returns to instruction 504 and proceeds as previously described.

Referring again to decision instruction 510, if the detected auxiliary light image was below and outside the image 24, the program advances to a decision instruction 512 to determine whether the below screen double click enable flag was set. If the flag was not set, the program returns to instruction 504 and proceeds as previously described.

If the enable flag was set, the program goes to an instruction 514 that sets the double click flag to disable the below screen double click feature. The program then advances to an instruction 516 that causes the double click command to be transmitted to the computer 12 from the saved position. The program then returns to instruction 504 and continues as previously described.

While the above referenced algorithm determines that an auxiliary light image was generated below the image 24, it will be understood by those skilled in the art that an algorithm could also detect auxiliary light above the image 24 on the viewing surface 22.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method for optically emulating a computer mouse input device to change a primary video image reflecting from a viewing surface, the primary image being defined by a plurality of pixel images arranged in a matrix array, where each pixel image is disposed at a specific x, y coordinate location within the array, comprising:

using an auxiliary light generating device to produce a sequence of auxiliary light information, said sequence of auxiliary light information being indicative of a mouse double click command in the form of sequenced spots of auxiliary control light reflecting from the viewing surface;

detecting a spot of auxiliary control light reflecting from the viewing surface;

determining initially whether the detected spot of auxiliary control light is tentatively an initial sequenced spot in said mouse double click command;

storing X, Y camera coordinate values of the detected spot of auxiliary control light if it is an initial sequenced spot in said mouse double click command, said X, Y camera coordinate values corresponding to at least one x, y computer coordinate location of one of the pixel images in the matrix array;

converting the stored X, Y camera coordinate values of the detected spot of auxiliary control light to the corresponding x, y coordinate values so they can be transmitted as part of said mouse double click command;

setting an on timer when the spot of auxiliary control light is detected within the matrix array of pixel images defining the primary image, said on timer being set to a predetermined period of time T in order to help facilitate optically emulating the double click command of the computer mouse input device;

determining whether the detected spot of light has been extinguished before said predetermined period of time T has elapsed;

setting an off timer when the detected spot of light has been extinguished, said off timer being set to a predetermined period of time t;

detecting another spot of auxiliary control light reflecting from the viewing surface;

determining whether the detected another spot of auxiliary control light is disposed within at least m coordinate locations of the stored X coordinate location and within at least n coordinate locations of the stored Y coordinate location;

setting said on timer again when the another spot of auxiliary control light is detected, said on timer being set to a predetermined period of time T in order to help facilitate optically emulating the double click command of the computer mouse input device;

determining whether the detected another spot of auxiliary control light has been extinguished before said predetermined period of time T has elapsed;

storing X, Y camera coordinate values of the another detected spot of auxiliary control light if it is the next sequenced spot in said mouse double click command, said X, Y camera coordinate value being determined to be within m coordinate locations of the previously stored X coordinate location and within n coordinate locations of the previously stored Y coordinate location;

converting the presently stored X, Y camera coordinate values of the another detected spot of auxiliary control light to the corresponding x, y coordinate values so they can be transmitted as part of said mouse double click command if the detected another spot of auxiliary control light was extinguished before the predetermined period of time T elapsed and if the another spot of light was disposed within at least m coordinate locations of the stored X coordinate location and within at least n coordinate locations of the stored Y coordinate location;

whereby when a sequence of auxiliary light spots are detected indicative of a double click command to cause said mouse double click command is transmitted.

2. A method for optically emulating a mouse in accordance with claim 1, wherein the detected another spot is below the primary image.

3. A method for optically emulating a mouse in accordance with claim 1, wherein the m by n coordinate values defines a small imaginary rectangular area.

4. A method of optically emulating a mouse in accordance with claim 3, wherein said small imaginary rectangular area is defined as m by n pixel locations within the periphery of said primary image.

5. A method of optically emulating a mouse in accordance with claim 4 wherein m by n is 4 by 2 pixels.

6. A method in accordance with claim 1, wherein neither one of the two mentioned spots of auxiliary light have a duration of greater than T seconds.

7. An optical input arrangement for use with an auxiliary light input device to optically emulate a computer mouse input device for changing a primary video image reflecting from a viewing surface, the primary image being defined by a plurality of pixel images arranged in a matrix array, where each pixel image is disposed at a specific X, Y coordinate location within the array and image processing means for detecting an auxiliary light spot, said auxiliary light spot being generated by the auxiliary light input device comprising:

means responsive to the image processing means for determining whether a detected spot of auxiliary control light reflecting from the viewing surface is disposed at a specific X, Y coordinate location in the primary image matrix array;

coordinate means responsive to the image processing means for determining whether another detected spot of auxiliary control light in a sequence of spots of auxiliary control light including at least the first-mentioned detected spot is disposed at said specific X, Y coordinate location or at least within m coordinate locations of the X coordinate location and within at least n coordinate locations of the Y coordinate location;

timing means responsive to the image processing means for generating a predetermined period of time commencing with the deactivation of the first mentioned detected spot; and means responsive to said timing means for transmitting a double click command when said another detected spot of auxiliary control light occurs relative to said predetermined period of time and is disposed at said specific X, Y coordinate location or at least within m coordinate locations of the X coordinate location and within at least n coordinate locations of the Y coordinate location.

8. An optical input arrangement for emulating optically a computer mouse input device to change a primary video image reflecting from a viewing surface in response to said auxiliary control light being indicative of auxiliary light information in the form of sequenced spots of light to define a mouse double click command, the primary image being defined by a plurality of pixel images arranged in a matrix array, where each pixel image is disposed at a specific x, y computer coordinate location within the array, comprising:

camera means for detecting the spots of auxiliary control light reflecting from the viewing surface;

means for determining initially whether a detected spot of auxiliary control light reflecting from the viewing surface is tentatively an initial sequenced spot in said mouse double click command;

means for storing coordinate information if the detected spot is an initial sequenced spot in said mouse double click command, said stored information being indicative of a specific determined X, Y camera coordinate location for the detected spot of auxiliary control light, said X, Y camera coordinate location corresponding to at least one x, y computer coordinate location of one of the pixel images in the matrix array;

modifying means for converting the stored X, Y camera coordinate location to the corresponding x, y coordinate location so the computer coordinate location of the detected spot can be transmitted as part of said mouse double click command;

clock means for helping to establish the timing interval between sequenced spots of light to facilitate optically emulating the computer mouse, said clock means including a spot ON clock and a spot OFF clock;

ON timer means for setting said ON clock to a predetermined period of time T when the detected spot of auxiliary control light is detected within the matrix array of pixel images defining the primary image, said ON clock being set to said period of time T in order to help facilitate optically emulating the double click command of the computer mouse input device;

means responsive to said ON timer means for determining whether the detected spot of light was extinguished before said predetermined period of time T elapsed;

OFF timer means for setting said OFF clock to a predetermined period of time t when the detected spot of light is extinguished;

means for determining whether another detected spot of auxiliary control light reflecting from the viewing surface is detected after said predetermined period of time t elapsed and is disposed within at least m coordinate locations of the stored X coordinate location and within at least n coordinate locations of the stored Y coordinate location;

said ON timer means setting said ON clock to another predetermined period of time T when the another spot of auxiliary control light is detected within the matrix array of pixel images defining the primary image;

said means responsive to said ON timer means determining whether the another detected spot of light extinguished before said another predetermined period of time T elapsed;

said means for storing coordinate information storing another X and Y camera coordinate location if the another detected spot is the next sequenced spot in said mouse double click command, said another X and Y camera coordinate location being determined to be within m coordinate locations of the previously stored X coordinate location and within n coordinate locations of the previously stored Y coordinate location;

said modifying means for converting the presently stored X, Y camera coordinate location of the another detected spot of auxiliary control light to the corresponding x, y computer coordinate location so the computer coordinate location of the another detected spot can be transmitted as part of said mouse double click command if the detected another spot of auxiliary control light extinguished before said another predetermined period of time T elapsed and if the another spot of light was disposed within at least m coordinate locations of the stored X coordinate location and within at least n coordinate locations of the stored Y coordinate location; and whereby when the sequence of auxiliary light spots are detected a mouse double click command is transmitted.

9. An optical input arrangement in accordance with claim 8, wherein T is about 0.75 seconds and t is about 0.75 seconds.

10. An optical input arrangement according to claim 8, further comprising:

relative coordinate means for determining whether said spot of auxiliary control light and said another spot of auxiliary control light both occurred with a given area of the viewing surface.

11. An optical input arrangement for emulating a mouse in accordance with claim 10, wherein said relative coordinate means includes below primary image algorithm means.

12. An optical input arrangement in accordance with claim 11, wherein said below primary image algorithm means determines whether said spot and said another spot of auxiliary control light resulted from auxiliary light images reflecting from a designated area beyond the periphery of said primary image.

13. An optical input arrangement according to claim 11, wherein said given area is below said primary image.

14. An optical input arrangement in accordance with claim 10, wherein said relative coordinate means includes direct primary image algorithm means.

15. An optical input arrangement in accordance with claim 14, wherein said direct primary image algorithm means determines whether said spot and said another spot of auxiliary control light resulted from auxiliary light images reflecting from a designated area within the periphery of said primary image.

16. An optical input arrangement in accordance with claim 15, wherein said designated area is a small imaginary rectangular area defined as a certain one of m by n pixels within the periphery of said primary image.

17. An optical input arrangement in accordance with claim 16, wherein said certain one of m by n pixels is determined by detecting an auxiliary light image having a size of about x by y pixels within the periphery of said primary image and having a duration of no greater than t seconds.

18. An optical input arrangement in accordance with claim 16, wherein said certain one of m by n pixels is 12 by 6 pixels.

19. An optical input arrangement in accordance with claim 18, wherein a more preferred m by n pixels is 8 by 4 pixels.

20. An optical input arrangement in accordance with claim 19, wherein the most preferred m by n pixels is 4 by 2 pixels.

21. An optical input arrangement according to claim 10, further comprising:

connector means for connecting a plurality of input units having substantially different communication rates to a host computer, said host computer having at least two separate communication speeds for receiving information from said input units;

switching means coupled to said connector means for establishing selectively a designated communication path between the host computer and one unit of said plurality of input units;

processor means for generating a selection signal for causing said switching means to establish a data communication path between said host computer and a single one only of said plurality of input units; and algorithm means disposed partially in said processor means and partially within said host computer for causing said host computer to receive data at a certain one of its communication rates.

* * * * *

UNITED STATES PATENT AND TRADEMARK OFFICE
CERTIFICATE OF CORRECTION

PATENT NO : 5,502,459

DATED : March 26, 1996

INVENTOR(S): Roger N. Marshall, et al.

It is certified that error appears in the above-identified patent and that said Letters Patent is hereby corrected as shown below:

Item 63, line 5, after "Nov. 9", delete "1999", and substitute therefor --1990--.

Signed and Sealed this

First Day of July, 1997

Attest:

BRUCE LEHMAN

*Attesting Officer*  *Commissioner of Patents and Trademarks*